US008234429B2

(12) United States Patent
Serebrin

(10) Patent No.: US 8,234,429 B2
(45) Date of Patent: Jul. 31, 2012

(54) MONITORING INTERRUPT ACCEPTANCES IN GUESTS

(75) Inventor: Benjamin C. Serebrin, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 442 days.

(21) Appl. No.: 12/613,076

(22) Filed: Nov. 5, 2009

(65) Prior Publication Data

US 2010/0191887 A1 Jul. 29, 2010

Related U.S. Application Data

(60) Provisional application No. 61/147,269, filed on Jan. 26, 2009.

(51) Int. Cl.
*G06F 13/24* (2006.01)

(52) U.S. Cl. ........... 710/260; 710/48; 718/100; 718/102

(58) Field of Classification Search .......... 710/260–269, 710/48; 718/1, 100, 102
See application file for complete search history.

(56) References Cited

U.S. PATENT DOCUMENTS

| 5,222,215 | A |   | 6/1993  | Chou et al.          |        |
|-----------|---|---|---------|----------------------|--------|
| 5,291,605 | A | * | 3/1994  | Takagi et al.        | 710/48 |
| 5,361,375 | A | * | 11/1994 | Ogi                  | 718/1  |
| 5,371,857 | A | * | 12/1994 | Takagi               | 710/260|
| 5,892,957 | A |   | 4/1999  | Normoyle et al.      |        |
| 6,332,169 | B1| * | 12/2001 | Hagersten            | 710/5  |
| 6,622,193 | B1|   | 9/2003  | Avery                |        |
| 6,977,908 | B2| * | 12/2005 | de Azevedo et al.    | 370/254|
| 7,000,051 | B2| * | 2/2006  | Armstrong et al.     | 710/267|
| 7,054,975 | B2| * | 5/2006  | Tjia                 | 710/263|
| 7,130,949 | B2|   | 10/2006 | Belmar et al.        |        |
| 7,209,994 | B1| * | 4/2007  | Klaiber et al.       | 710/264|
| 7,222,203 | B2| * | 5/2007  | Madukkarumukumana et al. | 710/260|
| 7,281,075 | B2| * | 10/2007 | Armstrong et al.     | 710/267|
| 7,380,041 | B2|   | 5/2008  | Belmar et al.        |        |
| 7,383,374 | B2| * | 6/2008  | Yamada et al.        | 711/6  |
| 7,546,406 | B2| * | 6/2009  | Armstrong et al.     | 710/267|
| 7,552,236 | B2|   | 6/2009  | Greenfield et al.    |        |
| 7,689,747 | B2|   | 3/2010  | Vega et al.          |        |
| 7,707,341 | B1|   | 4/2010  | Klaiber et al.       |        |
| 7,730,250 | B2| * | 6/2010  | Nanmoto              | 710/269|
| 7,809,875 | B2| * | 10/2010 | Sundaram et al.      | 710/260|
| 7,849,247 | B2| * | 12/2010 | Marietta et al.      | 710/264|
| 7,873,770 | B2|   | 1/2011  | Hummel et al.        |        |
| 7,917,740 | B1| * | 3/2011  | Klaiber et al.       | 712/244|

(Continued)

OTHER PUBLICATIONS

VMware Inc. Timekeeping in VMware Virtual Machines. Information Guide. 2010.*

(Continued)

*Primary Examiner* — Matthew D Spittle

(74) *Attorney, Agent, or Firm* — Lawrence J. Merkel; Meyertons, Hood, Kivlin, Kowert & Goetzel, P.C.

(57) ABSTRACT

In one embodiment, an interrupt acceptance control circuit is provided. The interrupt acceptance control circuit may monitor one or more guest interrupt controllers in a system in response to an IPI (or device interrupt) issued in a guest, to determine if each targeted vCPU in the guest has accepted the interrupt. If not, the interrupt acceptance control circuit may communicate the lack of acceptance to the VMM, in one embodiment. The VMM may attempt to schedule the vCPUs that have not accepted the interrupt, for example.

19 Claims, 7 Drawing Sheets

U.S. PATENT DOCUMENTS

| | | | |
|---|---|---|---|
| 7,945,905 B2 | 5/2011 | Kumar et al. | |
| 8,055,827 B2 | 11/2011 | Serebrin et al. | |
| 2004/0117532 A1 | 6/2004 | Bennett et al. | |
| 2004/0205272 A1 | 10/2004 | Armstrong et al. | |
| 2004/0215860 A1 | 10/2004 | Armstrong et al. | |
| 2005/0125580 A1 | 6/2005 | Madukkarumukumana et al. | |
| 2005/0228921 A1 | 10/2005 | Sethi et al. | |
| 2006/0075146 A1 | 4/2006 | Schoinas et al. | |
| 2006/0112212 A1* | 5/2006 | Hildner | 711/6 |
| 2008/0015712 A1 | 1/2008 | Armstrong et al. | |
| 2008/0114916 A1 | 5/2008 | Hummel | |
| 2008/0162762 A1 | 7/2008 | Neiger et al. | |
| 2010/0023666 A1 | 1/2010 | Mansell et al. | |
| 2010/0223611 A1 | 9/2010 | Mahalingam et al. | |
| 2011/0107328 A1* | 5/2011 | Serebrin et al. | 718/1 |
| 2011/0219157 A1* | 9/2011 | Yamaguchi et al. | 710/267 |

OTHER PUBLICATIONS

Advanced Micro Devices. AMD64 Virtualization Codenamed "Pacifica" Technology. Reference Manual. May 2005.*

Adams et al. A Comparison of Software and Hardware Techniques for x86 Virtualization. ACM. 2006.*

Dong et al. Towards High-Quality I/O Virtualization. SYSTOR. May 2009.*

Office Action from U.S. Appl. No. 12/611,595, mailed Dec. 17, 2010, 11 pages.

U.S. Appl. No. 12/961,186, filed Dec. 6, 2010, all pages.

U.S. Appl. No. 12/961,189, filed Dec. 6, 2010, all pages.

Office Action from U.S. Appl. No. 12/611,595, mailed May 27, 2011, Benjamin C. Serebrin, 7 pages.

International Search Report from PCT/US2010/022111 mailed Jun. 9, 2010, 13 pages.

U.S. Appl. No. 12/611,595, filed Nov. 3, 2009.

U.S. Appl. No. 12/611,607, filed Nov. 3, 2009.

U.S. Appl. No. 12/611,622, filed Nov. 3, 2009.

"Advanced Programmable Interrupt Controller (APIC)," Chapter 9, vol. 3, Sep. 2008, 68 pages.

Office Action from U.S. Appl. No. 12/611,607, mailed Sep. 27, 2011, Benjamin C. Serebrin, 10 pages.

Office Action from U.S. Appl. No. 12/611,622, mailed Dec. 16, 2011, Benjamin C. Serebrin, 9 pages.

* cited by examiner

MONITORING INTERRUPT ACCEPTANCES IN GUESTS

This application claims benefit of priority to U.S. Provisional Patent Application Ser. No. 61/147,269, filed Jan. 26, 2009. The Provisional Patent Application is incorporated herein by reference. To the extent that anything in the Provisional Patent Application contradicts material expressly included herein, the material herein controls.

BACKGROUND

1. Field of the Invention

This invention is related to processors and virtualization, and more particularly to delivering interrupts to virtual machine guests.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

One issue that can arise with in a virtual machine that has multiple virtual processors (or more briefly "vCPUs", for virtual central processing unit) is the delivery of interprocessor interrupts (IPIs) in the virtual machine. Generally, when a processor in a physical machine issues an IPI, the delivery of the interrupt to the processor or processors targeted by the IPI is assured. However, in a guest, one or more vCPUs of the virtual machine may not be executing at the time an IPI is issued in the guest.

SUMMARY

In one embodiment, an interrupt acceptance control circuit is provided. The interrupt acceptance control circuit may monitor one or more guest interrupt controllers in a system in response to an interrupt issued in a guest, to determine if each targeted vCPU in the guest has accepted the interrupt. The interrupt may be an IPI or a device interrupt sourced by a peripheral device, in various embodiments. If not, the interrupt acceptance control circuit may communicate the lack of acceptance to the VMM, in one embodiment. The VMM may attempt to schedule the vCPUs that have not accepted the interrupt, for example.

BRIEF DESCRIPTION OF THE DRAWINGS

The following detailed description makes reference to the accompanying drawings, which are now briefly described.

Figure 1:
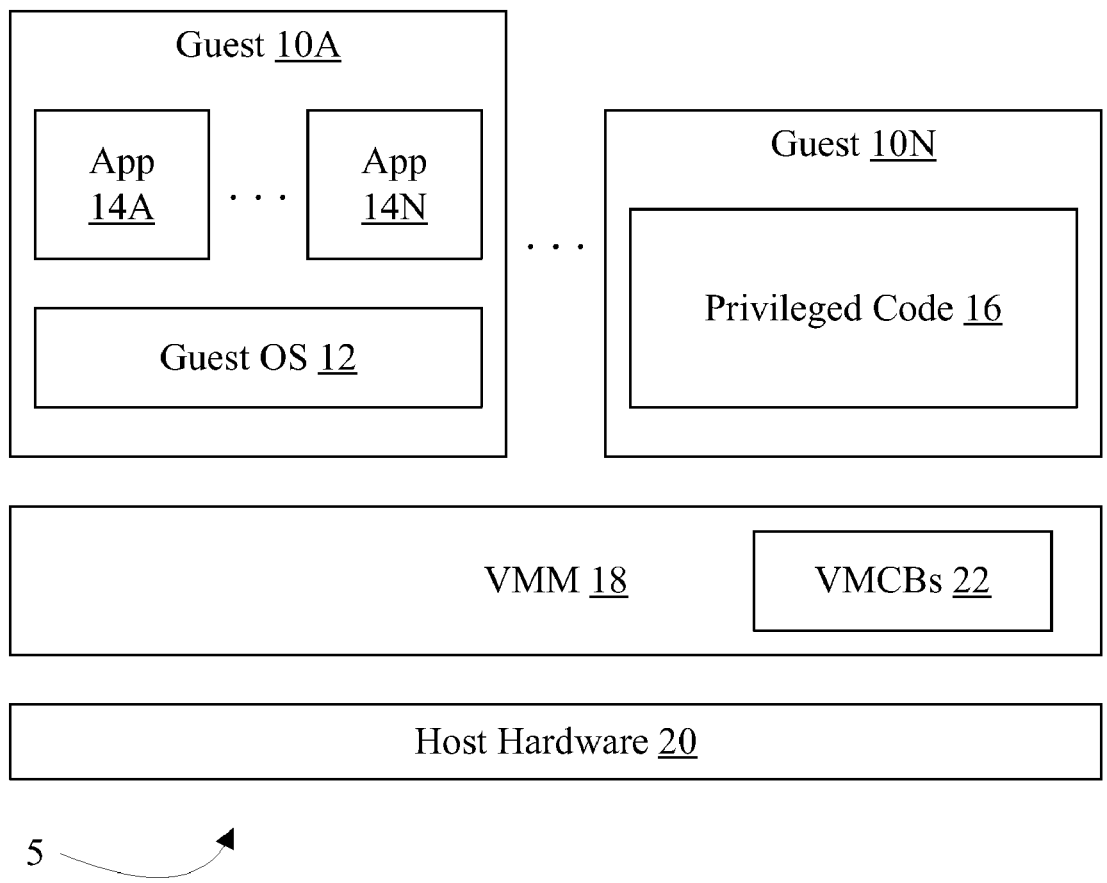
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In an embodiment, the interrupt control system for a computer system may include an interrupt controller for each processor in the system. That is, there may be a one-to-one correspondence between interrupt controllers and processors. For example, the Advanced Programmable Interrupt Controller (APIC) interrupt control system implemented in many personal computer systems includes a local APIC for each processor that is configured to record interrupts targeted at that processor, prioritize the interrupts and the task executing on that processor, and interrupt that processor as appropriate. Accordingly, in a multiprocessor system, the interrupts may be targeted at a specific processor or processors, and the corresponding local APIC may accept the interrupt on behalf of the processor and deliver the interrupt to the processor. The interrupts may include device interrupts sourced by a device in the computer system (e.g. an input/output (I/O) device or peripheral device), and may also include interprocessor interrupts (IPIs). An IPI may be an interrupt sourced by a processor, or more particularly by software executing on the processor. The IPI may target one or more processors in the system, sometimes including the sourcing processor. Accordingly, the IPI may be a mechanism for software executing on one processor to interrupt the software executing on another processor. IPIs may be used to pass messages between threads executing on different processors, to communicate an interrupt originally targeted at one processor to another processor, etc.

A guest virtual machine may implement the same interrupt control system (e.g. the APIC system). Thus, each virtual processor (vCPU) in the guest may have an associated virtual interrupt controller. In one embodiment, a computer system may include a hardware guest interrupt controller corresponding to each hardware processor in the system. The guest interrupt controller may be configured to manage interrupts that are to be serviced by a vCPU that is active on the corresponding hardware processor. The hardware processor may currently be acting as the corresponding vCPU in the guest, although the guest may not be currently running Software executing on one vCPU in the guest may issue an IPI within the guest, targeting one or more vCPUs. Some of the targeted vCPUs may be active in other processors, and thus the corresponding guest interrupt controllers in the computer systems may accept the IPI. However, some targeted vCPUs of the guest may be inactive. Accordingly, there may be no guest interrupt controller to accept the IPI for the inactive targeted vCPUs. In a non-virtualized environment, the targeted processors are hardware devices, and thus the IPIs may be known to reach their targets in a reasonably bounded period of time (e.g. on the order of 100 clock cycles or so). Such a bounded time period may not be guaranteed in a guest. Similarly, a device interrupt may be targeted at one or more vCPUs, and the guest interrupt controller for each active vCPU may accept the interrupt for the vCPU. However, it is possible that a targeted vCPU is not active (even for a device interrupt that targets only one vCPU).

In one embodiment, in order to somewhat bound the time period for interrupting an inactive, targeted vCPU, the computer system may include an interrupt acceptance control circuit configured to determine if a guest IPI or device interrupt has been accepted by the targeted vCPUs (or more particularly, the virtual interrupt controllers associated with the targeted vCPUs). Once the interrupt responses have been received from the hardware in the system, the interrupt acceptance control circuit may signal the VMM if one or more targeted vCPUs have not explicitly accepted the interrupt. Such a situation may occur, e.g., if one or more targeted vCPUs are inactive. The VMM may take corrective action (e.g. scheduling the inactive, targeted guest vCPUs) to ensure that the interrupt is serviced. In some embodiments, the signalling from the interrupt acceptance control circuit may be used to ensure that the interrupt is captured in the interrupt state associated with the inactive vCPU. In other embodiments, the interrupt state for each vCPU (active or inactive) stored in memory may be updated by a guest interrupt manager in the computer system. In such embodiments, the signalling to the VMM may be used to reduce the latency for servicing an interrupt for an inactive vCPU in the guest.

A processor or vCPU may be targeted by an interrupt if the interrupt is to be received by the interrupt controller associated with the processor/vCPU. The processor/vCPU may not necessarily process the interrupt, but may be a candidate for processing and may participate in determining which processor(s)/vCPU(s) will process the interrupt. An IPI may explicitly specify its target(s) (e.g. with a physical or logical ID), or may be a broadcast IPI that targets all processors/vCPUs. Generally, an interrupt may be referred to as accepted if the interrupt controller associated with a targeted processor has recorded the interrupt for delivery to the processor. That is, at some point in time after acceptance, the interrupt will be delivered to the processor. The interrupt controller may be configured to communicate acceptance or non-acceptance in a response (e.g. an acknowledgement, or ACK, for acceptance and non-acknowledgement, or NACK, for non-acceptance). Interrupting the processor to service the interrupt may be referred to as delivering the interrupt.

An IPI may be signaled using any desired mechanism. For example, in an embodiment, the local interrupt controller(s) for a processor include a command register which software can write with an IPI command. The IPI command may specify the IPI, its targets, delivery modes, etc. The interrupt controller may signal the IPI responsive to the command. Other embodiments may use hardware signalling between the processor and the interrupt controller to initiate an IPI. Similarly, a device interrupt may be signalled using any desired mechanism. For example, message signalled interrupts may be used, or dedicated interrupt conductors may be connected between devices and the interrupt controllers, or a combination thereof may be used.

The description below may use an IPI and monitoring acceptance of the IPI by guest interrupt controllers as an example. However, device interrupts may be handled in a similar fashion as the IPIs below in terms of monitoring for acceptance, in some embodiments.

Virtualization Overview

FIG. 1 illustrates a block diagram of one embodiment of a computer system 5 that implements virtualization. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. Specifically, the host hardware 20 may include one or more host interrupt controllers, one or more guest interrupt controllers, one or more guest interrupt managers, and/or one or more interrupt acceptance control circuits, as described in more detail below. For example, personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In various implementations, a guest interrupt manager may be implemented in the northbridge, the southbridge, or a device on one of the interfaces. Host and guest interrupt controllers may be implemented for each processor, or shared among a group of processors. In other embodiments, other circuitry may be used to link various hardware components. For example, HyperTransport™ (HT) links may be used to link nodes, each of which may include one or more processors, a host bridge, and a memory controller. Each node may also include a northbridge, which may include a guest interrupt manager and/or host and guest interrupt controllers. Alternatively, the host bridge may include a guest interrupt manager and/or host and guest interrupt controllers. The host bridge may be used to couple, via HT links, to peripheral devices in a daisy chain fashion. Any desired circuitry/host hardware structure may be used.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization. For example, the processors may provide hardware support for virtualization, including hardware to intercept events and exit the guest to the VMM 18 for handling. The guest interrupt managers, interrupt acceptance circuits, and/or guest interrupt controllers may be hardware provided to support virtualization as well.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the host, in one embodiment. Generally, the host may include any code that is in direct control of the host hardware 20 during use. For example, the host may be the VMM 18, the VMM 18 in conjunction with the host OS, or the host OS alone (e.g. in a non-virtualized environment).

In various embodiments, the VMM 18 may support full virtualization, paravirtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20.

With paravirtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a Minivisor. The Minivisor may execute in the guest physical address space, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Interrupt Acceptance

Figure 2:
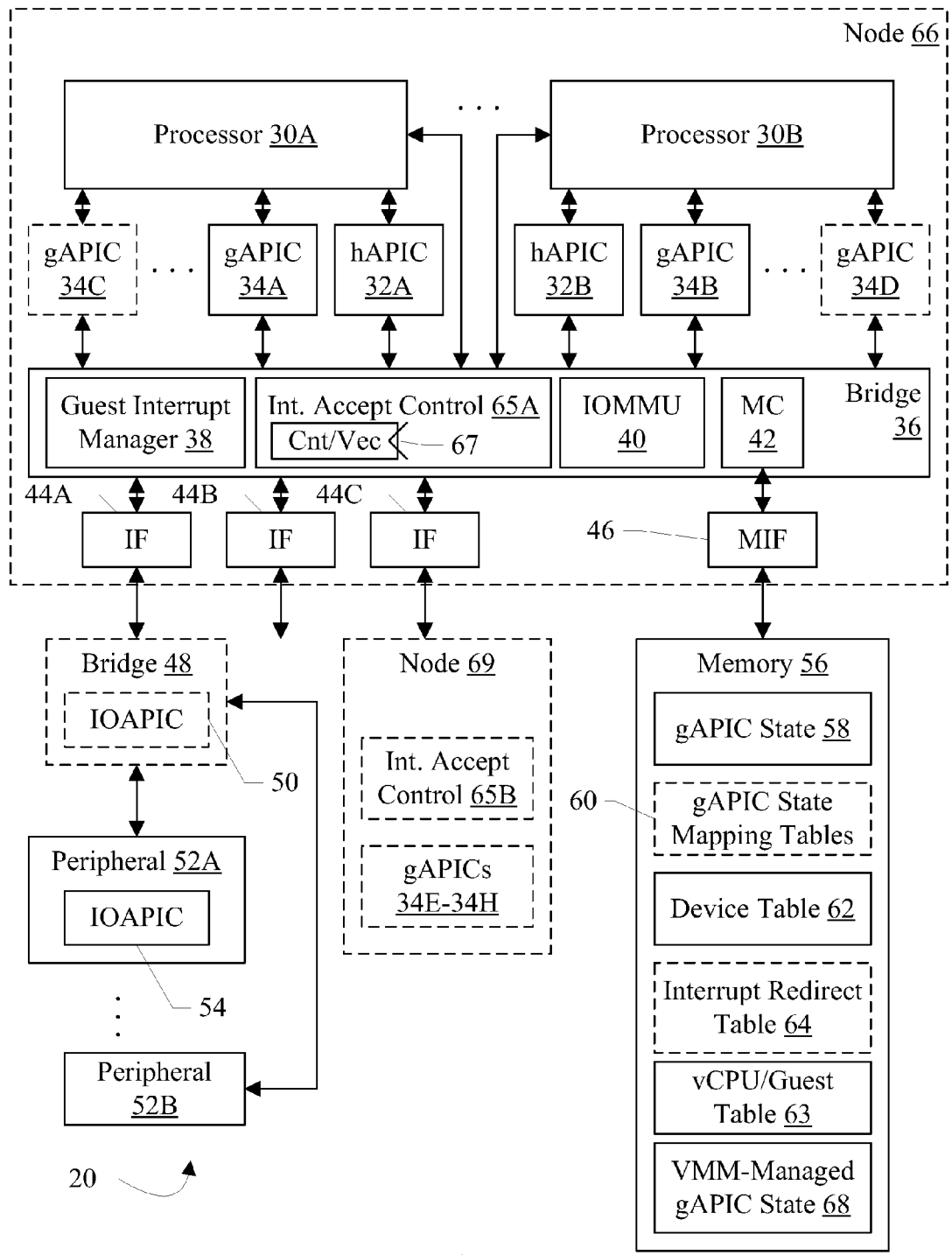
FIG. 2 is a block diagram of one embodiment of host hardware illustrated in FIG. 1.

Turning now to FIG. 2, a block diagram illustrating one embodiment of the host hardware 20 is shown. In the illustrated embodiment, the host hardware 20 includes a node 66 and optionally another node 69. The node 66 includes a plurality of processors 30A-30B, respective host Advanced Programmable Interrupt Controllers (hAPICs) 32A-32B, respective guest APICs (gAPICs) 34A-34B, and optional additional gAPICs 34C-34D, a bridge 36 (that includes a guest interrupt manager 38, an input/output (I/O) memory management unit (IOMMU) 40, an interrupt acceptance control circuit 65A that includes one or more count/vector registers 67, and a memory controller 42), a plurality of interface circuits (IF) 44A-44C, a memory interface circuit (MIF) 46, an optional bridge 48 that may include an IOAPIC 50, peripherals 52A-52B (some of which may include an IOAPIC such as the IOAPIC 54), and a memory 56. The processors 30A-30B are coupled to the bridge 36 and to the respective hAPICs 32A-32B and gAPICs 34A-34D as illustrated in FIG. 2. The hAPICs 32A-32B and gAPICs 34A-34D are coupled to the bridge 36, which is coupled to the interface circuits 44A-44C and the memory interface circuit 46. The memory interface circuit 46 is coupled to the memory 56, and the interface circuit 44A is coupled to the bridge 48, which is coupled to the peripherals 52A-52B. The second node 69 includes an interrupt acceptance control circuit 65B and gAPICs 34E-34H. In one embodiment, the second node 69 may be another instance of the node 66, including a similar set of components. In other embodiments, the second node 69 may include any desired components, including any subset or superset of the components of the node 66 and/or any other components. The second node 69 is coupled to the node 66 via an interface circuit 44C, for example, in the illustrated embodiment.

In the illustrated embodiment, each processor 30A-30B has an associated hAPIC 32A-32B and at least one associated gAPIC 34A-34D. In this embodiment, interrupts may be communicated in the host hardware 20 according to the APIC specification described by Intel Corporation (Santa Clara, Calif.). In that specification, each processor has an associated local APIC that receives interrupts (from the processor itself, other processors, internal APIC interrupt sources, and IOAPICs associated with peripherals. The local APIC prioritizes the pending interrupts, and transmits an interrupt to the processor if it is higher priority than another interrupt that is in progress on the processor and/or if it is higher priority than the processor's current task.

In the embodiment of FIG. 2, the hAPIC 32A-32B may be the local APIC for the processor's host interrupts (that is, interrupts to be processed by the host) and the gAPIC 36A-36D may be the local APIC for the processor's guest interrupts (that is, interrupts to be processed by a guest that is active on the respective processor 30A-30B). A guest may be active on a processor if the guest is currently executing on that processor (e.g. a VMRUN instruction has been executed on the processor for the guest, and a guest exit has not occurred), or if the guest has exited and the VMM 18 is executing, but the guest is expected to be executed again on the processor.

When the VMM 18 schedules a guest on a processor 30A-30B, the VMM 18 may load the gAPIC 34A-34D of that processor 30A-30B with the gAPIC state corresponding to the guest. Specifically, a given guest may have multiple virtual processors (vCPUs). The VMM 18 may schedule a vCPU of a guest to execute on the processor 30A-30B, and may load the gAPIC 34A-34D with the interrupt state for that vCPU within the guest's virtual machine. Additionally, any interrupts that are targeted at the guest (and vCPU) that are signalled while the guest is active may be accepted by the gAPIC 34A-34D. The accepted interrupts may include both device interrupts and IPIs sourced by the vCPU or targeted at the vCPU. The gAPIC 34A-34D may interrupt the guest according to the APIC specification, as mentioned above.

In response to the processor 30A-30B issuing an IPI, one of the APICs coupled to that processor 30A-30B may propagate the IPI to other APICs. If the processor 30A-30B is not executing a guest when the IPI is issued, the hAPIC 32A-32B may handle the IPI as specified in the APIC specification. If the processor 30A-30B is executing a guest when the IPI is issued, the gAPIC 34A-34D assigned to the guest may handle the IPI.

Similar to a host IPI, the guest IPI may be propagated to other gAPICs 34A-34D. However, the guest IPI may include the guest ID of the guest that issued the IPI, which may affect whether or not receiving gAPICs 34A-34D accept the IPI. Each gAPIC may respond to the guest IPI, indicating whether or not the IPI is accepted. In one embodiment, the gAPIC may indicate acceptance or non-acceptance (e.g. ACK or NACK). In another embodiment, the gAPIC may further supply its logical or physical ID (depending on the delivery mode for the interrupt) in the acceptance to explicitly identify which vCPU in the guest is accepting the IPI. The gAPICs 34A-34D may be programmable with the guest ID, which may be part of the state loaded into the gAPICs 34A-34D by the VMM 18.

The interrupt acceptance control circuit 65A may be configured to determine if the IPI is accepted by each targeted vCPU in the guest, for guest IPIs. The interrupt acceptance control circuit 65A may be configured to monitor the responses from the gAPICs 34A-34D, and may also be configured to participate in internode communication to collect responses from other nodes, when multiple nodes are included. The interrupt acceptance control circuit 65A may be configured to signal the VMM 18 in response to determining that one or more targeted vCPUs did not accept the IPI. The signalling may take various forms. For example, the interrupt acceptance control circuit 65A may signal a host interrupt to the VMM 18. Alternatively or in addition, the interrupt acceptance control circuit 65A may generate a log entry to a log data structure in memory that is checked by the VMM 18, indicating that one or more targeted vCPUs did not accept a guest IPI. In an embodiment, the interrupt acceptance control circuit 65A may include one or more registers to log the lack of acceptance of the IPI, and the VMM 18 may check the register(s) periodically or in response to an interrupt to detect the lack of acceptance of an IPI by one or more vCPUs.

In one embodiment, the interrupt acceptance control circuit 65A may be configured to determine whether or not the IPI has been accepted by each targeted vCPU, but not which specific vCPU(s) did not accept the IPI. In such an embodiment, counting the IPI acceptances may be sufficient to make the determination. In such an embodiment, the number of targets may be initialized in the counter/vector register 67. The number of targets may be explicit in the IPI (e.g. a logical IPI specifies the target vCPUs, and a physical IPI may specify a single target). In some embodiments, the number of targets may be implicit (e.g. a broadcast physical IPI may be targeted at each vCPU in the guest). For the broadcast case, the interrupt acceptance control circuit 65A may be configured to read a vCPU/guest table 63 in the memory 56. The vCPU/guest table 63 may be indexed by guest ID, and may specify the number of vCPUs in that guest. Thus, the count/vector register 67 may be initialized with the number of vCPUs (or the number of vCPUs minus one, if the source vCPU is not included in the IPI). The interrupt acceptance control circuit 65A may be configured to count the IPI acceptances, and based on the initial count and acceptances, the interrupt acceptance control circuit 65A may be configured to determine if each interrupt acceptance has been received. That is, once the responses from the gAPICs 34A-34D have been received, along with responses from other nodes such as the second node 69, the interrupt acceptance control circuit 65A may determine if there are any missing interrupt acceptances. For example, the interrupt acceptance control circuit 65A may decrement the count/vector register 67 and compare the final value to zero. Alternatively, the interrupt acceptance control circuit 65A may maintain a count of acceptances, and may compare the count to the initial count in the count/vector register 67.

In another embodiment, the interrupt acceptance control circuit 65A may track the interrupt acceptances by vCPU, so that the specific vCPUs that did not accept may be determined. In such an embodiment, a bit vector may be stored in the count/vector register 67. The bit vector may have a position for each vCPU (e.g. according the logical or physical ID of the vCPU, according to the type of IPI). The bit may be set to indicate that the respective vCPU is targeted and has not accepted the IPI, and may be clear other wise. Other embodiments may reverse the sense of the set and clear states. Accordingly, the count/vector register 67 may be initialized to indicate the targeted vCPUs (e.g. setting the respective bits), and the bits for vCPUs may be cleared as the acceptances are detected. Once the responses have been received from each gAPIC, if any set bits remain in the count/vector register 67, the set bits identify which vCPUs have not accepted the IPI. In the case of the broadcast physical IPI, the initial value in the count/vector register 67 may be derived from the vCPU/guest table 63. For example, the bit vector may have set bits for physical ID 0 to N−1, wherein N is the number of vCPUs read from the guest table 63.

An embodiment of the interrupt acceptance control circuit 65A may support both the counting of accepted IPIs and the specific identification of non-accepting vCPUs. The VMM 18 may select which type of tracking/reporting is desired, for example, in such embodiments.

Among the gAPICs 34A-34D and the interrupt acceptance control circuit 65A, the interrupt responses may be communicated using any format. For internode communication, the interrupt message and interrupt response may be based on the communication defined for the interface between the nodes. For example, in one embodiment, the interface circuits 44A-44C implement the HT interface. In such embodiments the interrupt and interrupt response packets may be used. The interrupt response packet may be modified, however, to return a count of the number of interrupt acceptances or a bit vector identifying the accepting vCPUs, in an embodiment.

The interrupt acceptance control circuit 65B may be configured to receive the interrupt message (e.g. in an HT interrupt packet) and, in the case of a guest IPI, the interrupt acceptance control circuit 65B may transmit the IPI to the gAPICs in the node 69 (e.g. the gAPICs 34E-34H in FIG. 2).

The interrupt acceptance control circuit 65B may aggregate the responses from the gAPICs in the node, and may transmit the interrupt response to the source node (e.g. the node 66). The interrupt acceptance control circuit 65A may receive the response, and may update the recorded acceptances accordingly. The interrupt acceptance control circuits 65A-65B may be instances of the same interrupt acceptance control circuit design, and thus the operation described for the interrupt acceptance control circuit 65A may apply to the interrupt acceptance control circuit 65B and vice versa.

It is noted that multiple IPIs may be pending in a given node at a given point in time. An IPI may be pending, in this context, if the IPI has been issued but not all of the responses have been received. For example, each processor 30A-30B may have an IPI in progress at the same point in time. The interrupt acceptance control circuit 65A may include a different register 67 for each processor 30A-30B (or a different field in a register), to concurrently track IPI acceptances for IPIs from each processor 30A-30B.

The hAPIC 32A-34B and gAPIC(s) 34A-34D for a given processor 30A-30B may have any interface to the processor. For example, any interface used between local APICs and their respective processors may be used. Each APIC may be configured to independently signal the processor that an interrupt is being delivered for service. If the processor is executing a guest and a guest interrupt is signalled, the processor may be configured to interrupt the guest code and begin execution of the correct interrupt handler within the guest's virtual machine. Thus, the guest interrupt may be delivered with a latency similar to the delivery of an interrupt in the host, in an embodiment. If the processor is executing a guest and the hAPIC signals an interrupt, the processor may be configured to exit the guest to the VMM 18 to process the host interrupt. If the processor is not executing the guest, an interrupt signalled by the gAPIC may be masked by the processor until the guest is executed again. If the processor is not executing the guest and the hAPIC signals an interrupt, the processor may be configured to interrupt the host execution and branch to the host interrupt handler.

In one embodiment, more than one gAPIC 34A-34D may be included per processor 30A-30B. Each gAPIC 34A-34D may store the APIC state corresponding to a different guest/vCPU. In such an embodiment, each gAPIC 34A-34D may be configured to identify which guest it corresponds to when signalling a guest interrupt to the processor (or the processor 30A-30B may have internal registers that identify which guest is currently assigned to each gAPIC 34A-34D). The processor may mask the guest interrupt if a different guest is currently in execution, similar to masking the guest interrupt when the VMM 18 is not executing. Alternatively, each gAPIC 34A-34D may include an active indication. The VMM 18 may modify the active indication to indicate that the gAPIC 34A is active when the corresponding guest is scheduled, and the gAPIC 34A-34D may be configured to only signal its guest interrupt when the corresponding guest is active. Including more than one gAPIC 34A-34D per processor 30A-30B may reduce the amount of gAPIC state movement when multiple guests are scheduled to execute on the processor over time. For example, if there are N gAPICs 34A-34D per processor 30A-30B (where N is an integer greater than 0), up to N different guests may be scheduled for execution before gAPIC state may need to be saved for any of the guests. In some embodiments that implement more than one gAPIC 34A-34D per processor 30A-30B, the gAPICs 34A-34D may include additional state to ensure the interrupt messages are properly accepted and/or logged. For example, the gAPICs 34A-34D may include a "currently running" indication that identifies whether or not the corresponding virtual machine is currently in execution on the corresponding processor 30A-30B (as opposed to being in suspension for VMM execution or while another virtual machine is executing). If the currently running indication indicates that the virtual machine is in execution, the gAPIC may accept the interrupt message. If the currently running indication indicates that the virtual machine is not in execution, the gAPIC may signal interrupt not accepted. Alternatively, the gAPIC may include an additional indication indicating whether or not the gAPIC is to signal interrupt not accepted. In such an embodiment, the gAPIC may signal interrupt not accepted if the currently running indication indicates not currently running and the not-accepted indication indicates that the gAPIC is to signal interrupt not accepted. Such functionality may be used to detect that an interrupt is received for a guest that is not running, which may be used to schedule the guest that is targeted by the interrupt.

The gAPICs 34A-34D may include at least a portion of the hardware that is included in the hAPICs 32A-32B, and may include all of the hardware (e.g. may be duplicates of the hAPICs 32A-32B). The gAPICs 34A-34D may be programmable with a guest identifier (ID), in addition to APIC state, to identify which guest the gAPIC 34A-34D is assigned to. If the guest includes multiple vCPUs, the physical APIC ID and logical APIC ID may identify the vCPU within the guest. In one embodiment, the guest ID may be the same as a domain ID supported by the IOMMU 40 for peripheral devices. Alternatively, the guest ID may be a separately managed resource. In either case, the VMM 18 may assign guest IDs to guests and may ensure that the gAPICs 34A-34D are programmed appropriately for each guest. The vCPU and/or gAPIC and/or the pair may be referred to herein more succinctly as the destination of an interrupt within the guest. The destination may ultimately be the vCPU that is to service the interrupt, but the corresponding gAPIC may also be viewed as the destination since it is associated with the corresponding processor and records the interrupt.

The gAPICs 34A-34D and hAPICs 32A-32B are coupled to the bridge 36 to receive interrupts. Any interface may be used to transport interrupts to the gAPICs 34A-34D and hAPICs 32A-32B. For example, any interface implemented for APIC interrupt transport may be used. In one embodiment, the same communication mechanism used to communicate other operations to/from the processors 30A-30B (such as memory read/write operations initiated by the processors 30A-30B, probes for cache coherency maintenance, etc.) may be used to transport interrupt messages. Viewed in another way, the coupling of the gAPICs 34A-34D and the hAPICs 32A-32B may be shared with the coupling of the processors 30A-30B to the bridge 36. Alternatively, the processors 30A-30B may have a separate path to the bridge 36, such as if the gAPICs 34A-34D and the hAPICs 32A-32D use the APIC "3 wire interface." An interrupt message may be any communication on any interface that identifies the interrupt being transmitted and the destination of the interrupt. For example, interrupts may have associated interrupt vectors, and the interrupt vector may be part of the interrupt message. The interrupt message may also include the guest ID and destination ID (e.g. logical or physical APIC ID).

The hAPICs 32A-32B may be similar to local APICs. For example, the hAPICs 32A-32B may not include the additional hardware for guest identification, since the hAPICs are used for host interrupts. Alternatively, the hAPICs 32A-32B may include the additional hardware but the additional hardware may be programmed to indicate that the hAPICs 32A-32B are for host interrupts. The interrupt messages transmitted by the bridge 36 to the hAPICs 32A-32B and gAPICs 34A-34D may identify guest interrupts as opposed host interrupts, and may include the guest ID for guest interrupts (or may use a reserved guest ID, such as zero or all binary ones, to indicate a host interrupt). The hAPICs 32A-32B maybe configured to accept interrupts that are identified as host interrupts (if the physical APIC ID or the logical APIC ID of the host interrupt matches the corresponding hAPIC ID), and the gAPICs 34A-34D may be configured to accept the guest interrupts for their respective guests (if the guest ID matches, and if the physical APIC ID or the logical APIC ID of the guest interrupt match the corresponding gAPIC ID).

While the gAPICs 34A-34D may manage interrupts for active guests, some guests may be inactive (and/or may have inactive vCPUs that may be targeted by a guest interrupts). In one embodiment, the guest interrupt manager 38 may be configured to maintain guest interrupt state for inactive guests and to ensure that the gAPICs for the active guests receive their interrupts.

Particularly, in one embodiment, the guest interrupt manager 38 may employ a distributed interrupt delivery scheme in which the guest interrupt manager 38 may be configured to record each guest interrupt received in the bridge 36 (including IPIs), and may also be configured to transmit the guest interrupt to each gAPIC 34A-34D. If a gAPIC 34A-34D accepts the interrupt, then the guest targeted by the guest interrupt is active. If no gAPIC 34A-34D accepts the interrupt, the guest targeted by the guest interrupt is inactive.

In the illustrated embodiment, the guest interrupt manager 38 may be configured to maintain the gAPIC state for the guests that are defined in the system 5 in a gAPIC state data structure 58 in the memory 56. The gAPIC state data structure 58 may include a gAPIC state entry for each gAPIC defined in the system (e.g. one entry for each vCPU in each guest 10A-10N in the system). A gAPIC may be defined in the system if it is associated with either an active guest or an inactive guest in the system. Accordingly, in response to receiving a guest interrupt, the guest interrupt manager 38 may be configured to update the gAPIC state in the gAPIC state data structure 58 for the guest/vCPU targeted by the interrupt. The guest interrupt manager 38 may be configured to update the gAPIC state independent of whether or not the guest is active, in one embodiment. For multicast and broadcast interrupts that have more than one target, the guest interrupt manager 38 may be configured to update the gAPIC state in the gAPIC state data structure 58 for each interrupt destination. Alternatively, the guest interrupt manager 38 may be configured to rely on the VMM 18 for these multiple destination interrupts. The guest interrupt manager 38 may be configured to log the interrupt in a memory location accessible to the VMM 18 in such embodiments, and may be configured to signal the VMM 18 to process the message.

In some embodiments, the guest interrupt manager 38 may be configured to locate the gAPIC state entry in the gAPIC state data structure 58 directly in response to the guest ID and/or other information in the guest interrupt message. In other embodiments, to provide flexibility in the gAPIC state data structure 58 and/or to conserve memory space, the guest interrupt manager 38 may be configured to use gAPIC state mapping tables 60 to locate the gAPIC state entry in the gAPIC state data structure 58. Accordingly, in response to a guest interrupt, the guest interrupt manager 38 may be configured to locate the gAPIC state entry using the gAPIC state mapping tables 60 and to update the gAPIC state entry to record the interrupt.

In one embodiment, the gAPIC state data structure 58 may store a subset of the gAPIC state. The subset may be the gAPIC state that is tracked by the hardware 20 (e.g. the guest interrupt manager 38, in conjunction with the IOMMU 40). More particularly, the subset may be the portion of the gAPIC state that may change while the corresponding guest is inactive. For example, in one embodiment, a peripheral 52A-52B may signal an interrupt while the corresponding guest is inactive, which may cause a corresponding interrupt request to be accepted by the gAPIC. The interrupt requests may be tracked in the gAPIC state data structure 58. Similarly, an IPI from an active guest/vCPU may target inactive vCPU(s) in the guest. Other gAPIC state may track which interrupts are in-service by the processor, the task priority of the processor, etc. These values may only change when the guest is active. In an embodiment, gAPIC state that may not change when the guest is inactive may be tracked by the VMM 18, using one or more other data structures illustrated as VMM-managed gAPIC state data structure 68 in FIG. 2. The VMM 18 may transfer state between the VMM-managed state 68 and the gAPICs 34A-34D as part of activating and deactivating guests in the system.

While the gAPIC state mapping tables 60 and the gAPIC state data structure 58 are shown as stored in memory 56 in the illustrated embodiment, portions of one or both may be cached by the guest interrupt manager 38 and/or a cache accessible to the bridge 36. In addition or alternatively, a dedicated memory for one or more gAPIC state entries may be implemented in the bridge 36. The dedicated memory may store a set of "fast" gAPIC states that may rapidly be switched into and out of the gAPICs 34A-34D. Other gAPIC states may be more slowly accessible in the memory 56. In some embodiments, the fast gAPIC state switches may be handled by the guest interrupt manager 38 while the slower gAPIC state switches may be handled by the VMM 18.

In the APIC interrupt mechanism, each processor (through its local APIC) may have a physical APIC ID and a logical APIC ID. The physical APIC ID is stored in the APIC ID register. A physical APIC ID is matched on a one-to-one basis with the physical APIC ID indicated by a physical delivery mode interrupt. The logical APIC ID is stored as the logical destination register in the local APIC. The logical APIC ID has a cluster ID and a local APIC ID, where the local APIC ID is a bit vector. Logical delivery mode interrupts may include any set bits in the bit vector to deliver interrupts to one or more local APICs in the cluster. Accordingly, matching a logical APIC ID may include comparing the cluster ID and detecting a set bit in the local APIC ID vector at the same position as the set bit of the bit vector in the local APIC. Viewed in another way, the local APIC ID vector in a logical delivery mode interrupt may be logically ANDed with the local APIC ID vector of the local APIC, and if the result is non-zero and the cluster ID matches, then the local APIC is a target of the logical interrupt. The logical APIC ID may be more succinctly referred to herein as the logical ID, and similarly the physical APIC ID may be more succinctly referred to herein as the physical ID. A given ID (logical or physical) associated with an interrupt may be referred to as the destination ID of the interrupt. A corresponding delivery mode for the interrupt may identify the destination ID of the interrupt.

The gAPICs 34A-34D may support both physical and logical delivery modes as well. In addition to matching the APIC ID in an interrupt message according to the mode as highlighted above, the gAPICs 34A-34D may match the guest ID in the interrupt message to the guest ID in the gAPIC.

The IOMMU 40 may be configured to perform virtual to physical address mapping for I/O-initiated memory operations (e.g. memory read/write operations sourced from the peripherals 52A-52B or by DMA controllers on behalf of the peripherals 52A-52B). As part of the translation operation, the IOMMU 40 may be configured to access a device table 62 and optionally an interrupt redirect table 64. The device table 62 may include entries for each peripheral 52A-52B (and may include multiple entries for a peripheral that includes more than one identifier on the peripheral interface to which the peripherals are coupled). The device table 62 may include a page table pointer to I/O page tables for translating the memory addresses of the memory read/write operations (not shown) and may include a pointer to the interrupt redirect table 64. In some embodiments, the device table 62 may store a guest ID for peripherals that are assigned to a guest. In one embodiment, the guest ID may be the same as a domain ID used for device access protection in the IOMMU 40. Alternatively, the guest ID may be separately assigned. In an embodiment, the device table 62 may also store a pointer to the gAPIC state mapping tables 60 (if used), or a pointer to the gAPIC state data structure 58. In another embodiment, the guest ID and/or the pointer to the table 60/data structure 58 may be stored in the interrupt redirect table 64. The interrupt redirect table 64 may be used to redirect an interrupt from its original destination and/or interrupt vector to a new destination and/or interrupt vector. For simplicity in the remainder of this disclosure, an embodiment in which the guest ID is the domain ID from the device table 62 and the pointer to the mapping tables 60 and/or gAPIC state data structure 58 is stored in the device table 62 will be used. However, the embodiments in the remainder of this disclosure may be generally modified as discussed above.

In other embodiments, the guest interrupt manager 38 may not be provided. Such a configuration may be possible, for example, if the VMM 18 updates the device table 62 and/or the interrupt redirect table 64 when guests are migrated from one processor 30A-30B to another, and if a processor 30A-30B is dedicated to receive interrupts on behalf of inactive guests (to update the gAPIC state data structure 58 in the memory 56 and/or to service the interrupt, as desired).

The memory controller 42 may be coupled to receive memory operations issued by the processors 30A-30B (e.g. instruction fetches, load/store data accesses, processor page table accesses for translation, etc.), memory operations from the guest interrupt manager 38 (e.g. to read/update the gAPIC state data structure 58 and/or the gAPIC state mapping tables 60), the IOMMU 40 (e.g. to access I/O page tables, the device table 62, and the interrupt redirect table 64), and memory operations received from the interface circuits 44A-44C (in some embodiments). The memory controller 42 may be configured to order the memory operations, and to communicate with the memory 56 to perform the memory operations. The memory interface circuit 46 may perform the physical level accesses to the memory 56.

The memory 56 may comprise any type of memory. For example, the memory 56 may comprise dynamic random access memory (DRAM) such as synchronous DRAM (SDRAM), double data rate (DDR, DDR2, DDR3, etc.) SDRAM, RAMBUS DRAM, static RAM, etc. The memory 56 may include one or more memory modules comprising multiple memory chips, such as single inline memory modules (SIMMs), dual inline memory modules (DIMMs), etc.

In addition to including the guest interrupt manager 38, the IOMMU 40, and the memory controller 42 in this embodiment, the bridge 36 may also include other communication functionality to communicate between the processors 30A-30B, the hAPICs 32A-32B, the gAPICs 34A-34D, and devices coupled to the interface circuits 44A-44D. For example, in the illustrated embodiment, another bridge 48 may be coupled to the interface circuit 44A, and may be configured to bridge communications between the protocol used by the interface circuit 44A and the protocol used by the peripherals 52A-52B. In one embodiment, the interface circuits 44A-44C may implement the HT interface mentioned above, for example, and the bridge 48 may bridge from HT to another interface such as the PCI Express (PCIe) interface. The peripherals 52A-52B may be PCIe devices in such an embodiment. The bridge 48 may also be configured to bridge to other interfaces, or another bridge may be coupled to the bridge 48 to bridge to other interfaces. Any peripheral interface or interfaces may be used. Additionally, the peripherals 52A-52B may comprise HT peripherals configured to couple directly to the HT interface. Such peripherals may not require the bridge 48.

In one embodiment, the bridge 48 and/or one or more of the peripherals 52A-52B may include IOAPICs (50 and 54 in FIG. 2). The IOAPICs may be responsible for receiving interrupt requests from the peripherals, and forming interrupt messages to transmit the interrupt requests to the hAPICs 32A-32B and the guest interrupt manager 38 (for transmission to the gAPICs 34A-34D and/or recording in the gAPIC state data structure 58 in memory).

As mentioned above, in one embodiment, the interface circuits 44A-44C may be configured to communicate on the HT interface. The interface circuits 44A-44C may be configured to communicate with peripheral devices/bridges using HT. Additionally, in some embodiments, the interface circuits 44A-44C may be coupled to other nodes with processors, hAPICs, gAPICs, etc. In such embodiments, the bridge 36 may include coherence management circuitry in addition to the previously described circuitry.

The processors 30A-30B may implement any instruction set architecture, and may be configured to execute instructions defined in the instruction set architecture. The processors 30A-30B may include any microarchitecture, such as superpipelined, superscalar, and/or combinations thereof; in-order or out-of-order execution; speculative execution; etc. The processors 30A-30B may or may not implement microcoding techniques, as desired.

The peripherals 52A-52B may comprise any type of peripheral device. The peripherals 52A-52B may include storage devices such as magnetic, solid state, or optical disk drives, non-volatile memory devices such as Flash memory, etc. The peripherals 52A-52B may include I/O devices such as user I/O devices (keyboard, mouse, display, voice input, etc.), networking devices, external interface devices such as Universal Serial Bus (USB) or Firewire, etc.

In the illustrated embodiment, the processors 30A-30B, the bridge 36, the hAPICs 32A-32B, the gAPICs 34A-34D, the interface circuits 44A-44C, and the memory interface circuit 46 may be integrated onto a single semiconductor substrate as an integrated circuit. Other embodiments may implement different amounts of integration and discrete circuitry, as desired. It is noted that, while various numbers of components such as processors, hAPICs, gAPICs, interface circuits, peripherals, bridges, etc. are illustrated in FIG. 2, other embodiments may implement any number of one or more of each component, as desired. In general, a node may comprise one or more integrated circuits and their local interconnection, which may communicate as a unit on another interface (e.g. the interface on which the interface circuits 44A-44C are configured to communicate, such as the HT interface).

In other embodiments, the location of the IOMMU 40 and the guest interrupt manager 38 may vary. For example, one or both may be in the bridge 48, in the peripherals 52A-52B, in another bridge coupled to the bridge, etc.

In the illustrated embodiment, each gAPIC 34A-34D and hAPIC 32A-32B is associated with a particular processor 30A-30B as illustrated in FIG. 2. Thus, a given interrupt controller is dedicated to the corresponding processor 30A-30B in this embodiment. More particularly, in FIG. 2: the hAPIC 32A and the gAPICs 34A and 34C are dedicated to the processor 30A; and the hAPIC 32B and the gAPICs 34B and 34D are dedicated to the processor 30B. An interrupt controller may signal an interrupt to its corresponding processor in any fashion. Generally, the signalling may indicate that an interrupt is needed. The signalling may include the interrupt vector, or the interrupt vector may be read by software executed after the interrupt is delivered. Servicing an interrupt may refer to executing an interrupt service routine associated with the interrupt vector to perform the operations needed by the interrupting device.

It is noted that, while the APIC is used as an exemplary interrupt mechanism herein, other embodiments may implement other interrupt mechanisms. It is noted that, while the guest interrupt manager 38 is illustrated as a block herein, the circuitry implementing the guest interrupt manager 38 may be distributed. For example, in an embodiment, the portion of the guest interrupt manager 38 that optionally processes the gAPIC state mapping table 60 and generates the update for the gAPIC state data structure 58 may be included in the IOMMU 40, so the IOMMU 40 transmits an update for the gAPIC state data structure 58 and transmits the interrupt message to be broadcast to the gAPICs 34A-34D. Any implementation of the guest interrupt manager 38 in one or more physical locations may be used.

Figure 3:
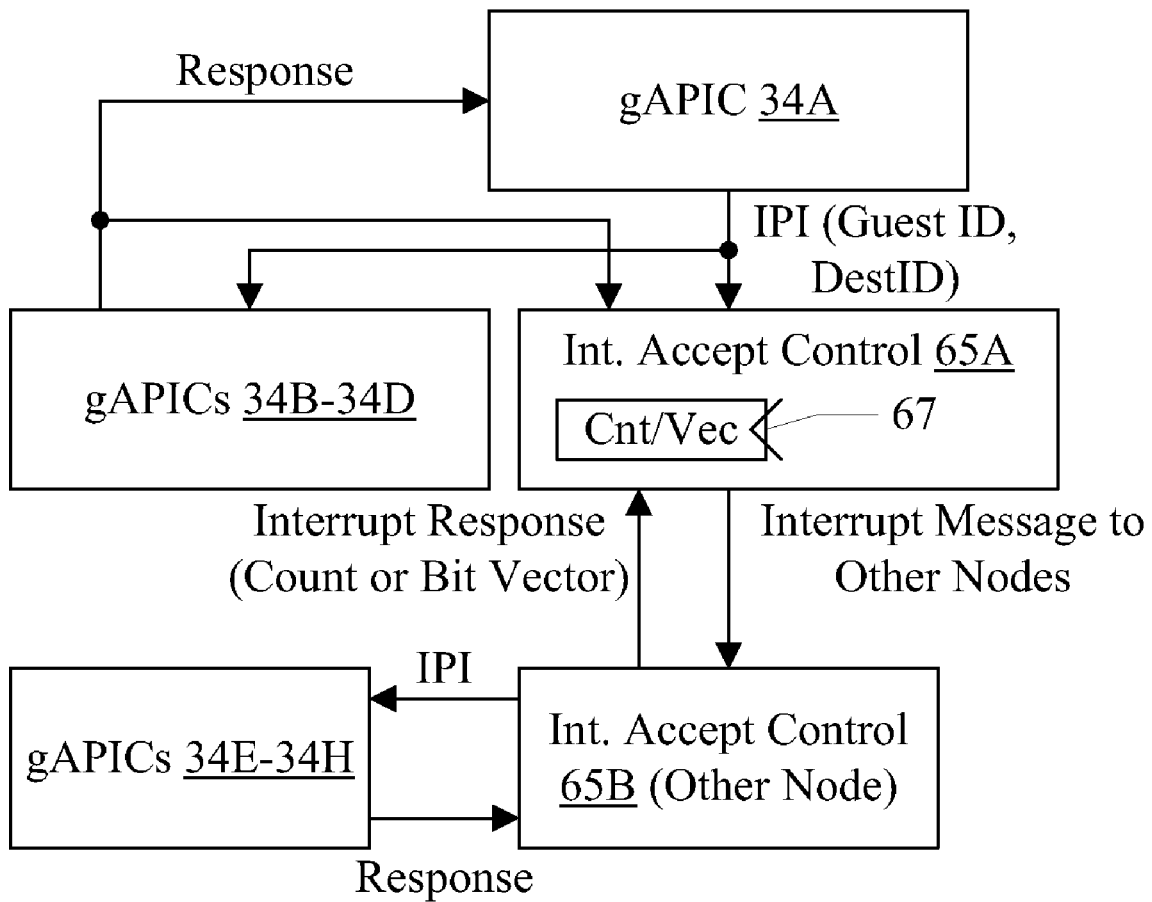
FIG. 3 is a block diagram illustrating one embodiment of monitoring interrupt acceptances for an IPI.

Turning next to FIG. 3, a block diagram is shown illustrating one embodiment of monitoring interrupt acceptances for an IPI. In the illustrated embodiment, an IPI is issued by one of the gAPICs (gAPIC 34A in this example). The IPI includes the guest ID from the gAPIC 34A, and a destination ID (DestID) identifying the targets of the IPI within the guest corresponding to the guest ID. The interrupt acceptance control circuit 65A may be coupled to receive the IPI, as may the other gAPICs 34B-34D in the same node as the source gAPIC 34A. The interrupt acceptance control circuit 65A may be configured to initialize the count/vector register 67 to track the IPI acceptances. Each of the gAPICs 34B-34D may determine whether or not their vCPU is targeted by the IPI, and may respond with an acceptance if so. If not, the gAPIC 34B-34D may respond with no acceptance. The interrupt acceptance control circuit 65A may monitor the responses, and may update the tracked state of the acceptances in response.

Additionally, the interrupt acceptance control circuit 65A may generate an interrupt message to be sent to other nodes, in embodiments of the host hardware 20 that implement more than one node. The interrupt acceptance control circuit(s) in the other nodes (e.g. the interrupt acceptance control circuit 65B in the node 69, for the embodiment of FIG. 2), may receive the interrupt message. The interrupt acceptance control circuit 65B may transmit the IPI to the gAPICs in the node 69 (e.g. the gAPICs 34E-34H). The interrupt acceptance control circuit 65B may aggregate the responses from the gAPICs 34E-34H and return an interrupt response to the source node (and more particularly to the interrupt acceptance control circuit 65A). The aggregated response may represent the individual responses. For example, in embodiments that are counting IPIs, the aggregate response may be the count of acceptances within the node. In embodiments that specifically identify the responding vCPUs, the aggregate response may be a bit vector having set bits for each responding vCPU, according to its physical or logical ID in the guest. The interrupt acceptance control circuit 65A may update its tracked state for the IPI in response to the interrupt response.

Since the interrupt acceptance control circuits 65A-65B may process IPIs that are sourced by a gAPIC within the same node as well as IPIs that are sourced by a gAPIC in another node, it may sometimes be convenient to refer to a local IPI versus a remote IPI herein. The local IPI may be an IPI sourced from a gAPIC in the same node, and a remote IPI may be sourced from a gAPIC in another node. The local/remote nature is relative: a local IPI for the interrupt acceptance control circuit 65A is a remote IPI for the interrupt acceptance control circuit 65B, and vice versa.

Figure 4:
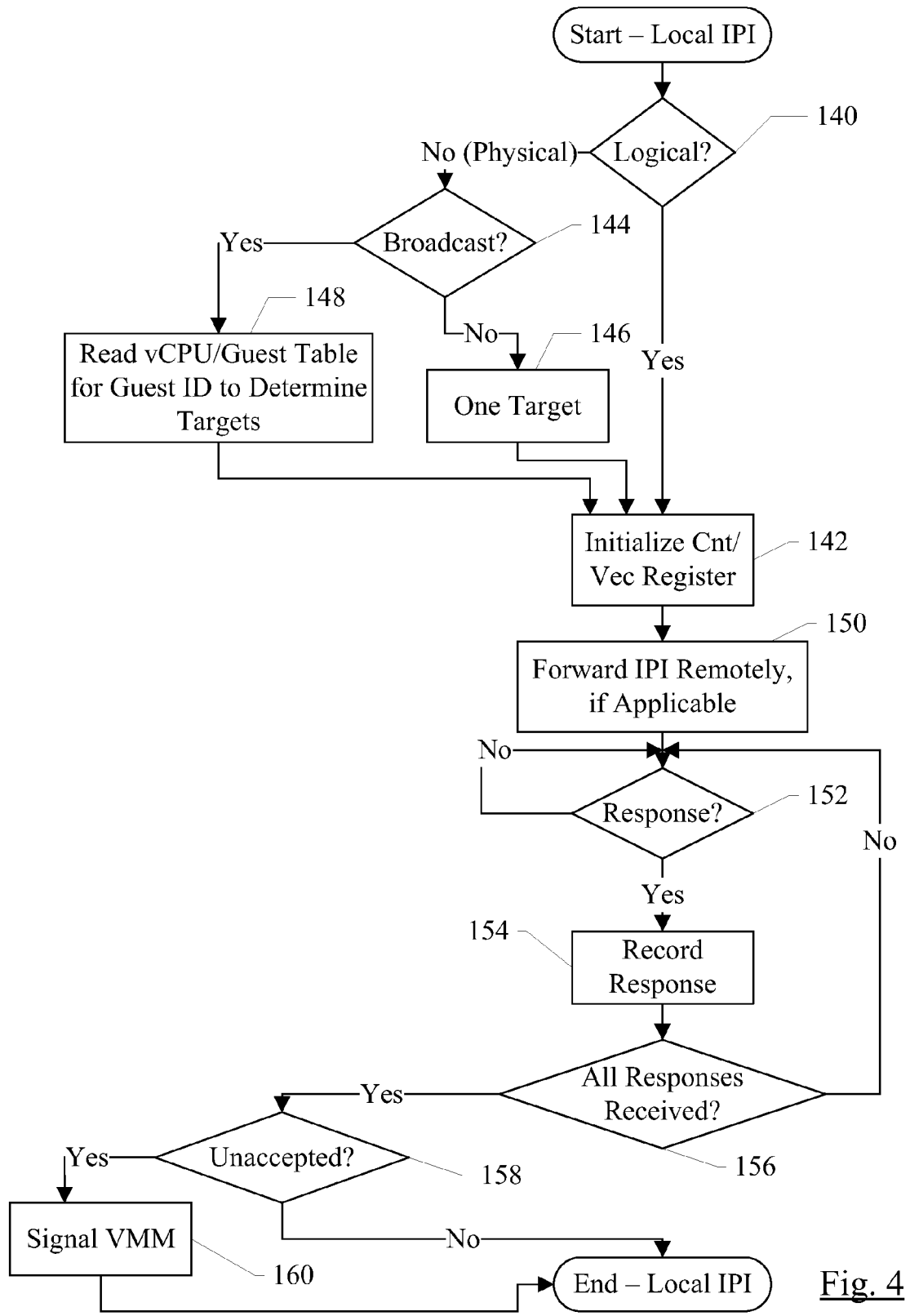
FIG. 4 is a flowchart illustrating operation of one embodiment of an interrupt acceptance control circuit in response to a local IPI.

Turning now to FIG. 4, a flowchart is shown illustrating operation of one embodiment of the interrupt acceptance control circuit 65A in response to a local IPI. The interrupt acceptance control circuit 65B may be similar. While the blocks are shown in a particular order for ease of understanding, other orders may be used. Blocks may be performed in parallel in combinatorial logic circuitry in the interrupt acceptance control circuit 65A. Blocks, combinations of blocks, and/or the flowchart as a whole may be pipelined over multiple clock cycles. The flowchart of FIG. 4 illustrates operation in response to one local IPI. If multiple IPIs are supported in parallel, similar operation may be implemented in parallel for the other IPIs.

The IPI may be a logical IPI or a physical IPI, as described above. If the IPI is logical (decision block 140, "yes" leg), the interrupt acceptance control circuit 65A may be configured to initialize the count/vector register 67 to track the interrupt acceptances (block 142). If the count of the interrupt acceptances is used, the interrupt acceptance control circuit 65A may count the number of set bits in the vector portion of the logical ID to initialize the count. If the specific identification of non-accepting vCPUs is used, the vector portion of the logical ID may be stored in the count/vector register 67. If the IPI is physical (decision block 140, "no" leg) and is not broadcast (decision block 144, "no" leg), the IPI has a single destination/target (block 146). The counter/vector register 67 may be initialized with a count of one, or a set bit in the bit location assigned to the target's physical ID (block 142). On the other hand, if the physical IPI is broadcast (decision block 140, "no" leg and decision block 144, "yes" leg), the interrupt acceptance control circuit 65A may read the vCPU/guest table 63 for the guest ID to determine the number of targets (block 148). The interrupt acceptance control circuit 65A may be configured to initialize the count/vector register 67 with the count or with a vector of set bits equal in number to the value from the vCPU/guest table (block 142).

The interrupt acceptance control circuit 65A may be configured to forward the IPI to remote nodes, if applicable (block 150). The interrupt acceptance control circuit 65A may be configured to monitor the interrupt responses (both local and remote, as applicable). If a response is received (decision block 152, "yes" leg), the interrupt acceptance control circuit 65A may process the response, recording interrupt acceptances in the responses (block 154). If all responses have not been received (decision block 156, "no" leg), the interrupt acceptance control unit 65A may continue to await responses. The number of expected responses may be the number of local gAPICs plus the number of remote nodes. Once the expected responses have been received (decision block 156, "yes" leg), the interrupt acceptance control unit 65A may determine if there are any unaccepted interrupts (decision block 158). For example, if the count/vector register 67 is decremented for each acceptance, the updated count may be compared to zero, and there may be unaccepted interrupts if the updated count is not zero. The updated bit vector may be checked for set bits. If there are unaccepted interrupts (decision block 158, "yes" leg), the interrupt acceptance control circuit 65A may be configured to signal the VMM 18 and/or log the lack of acceptance (block 160).

Figure 5:
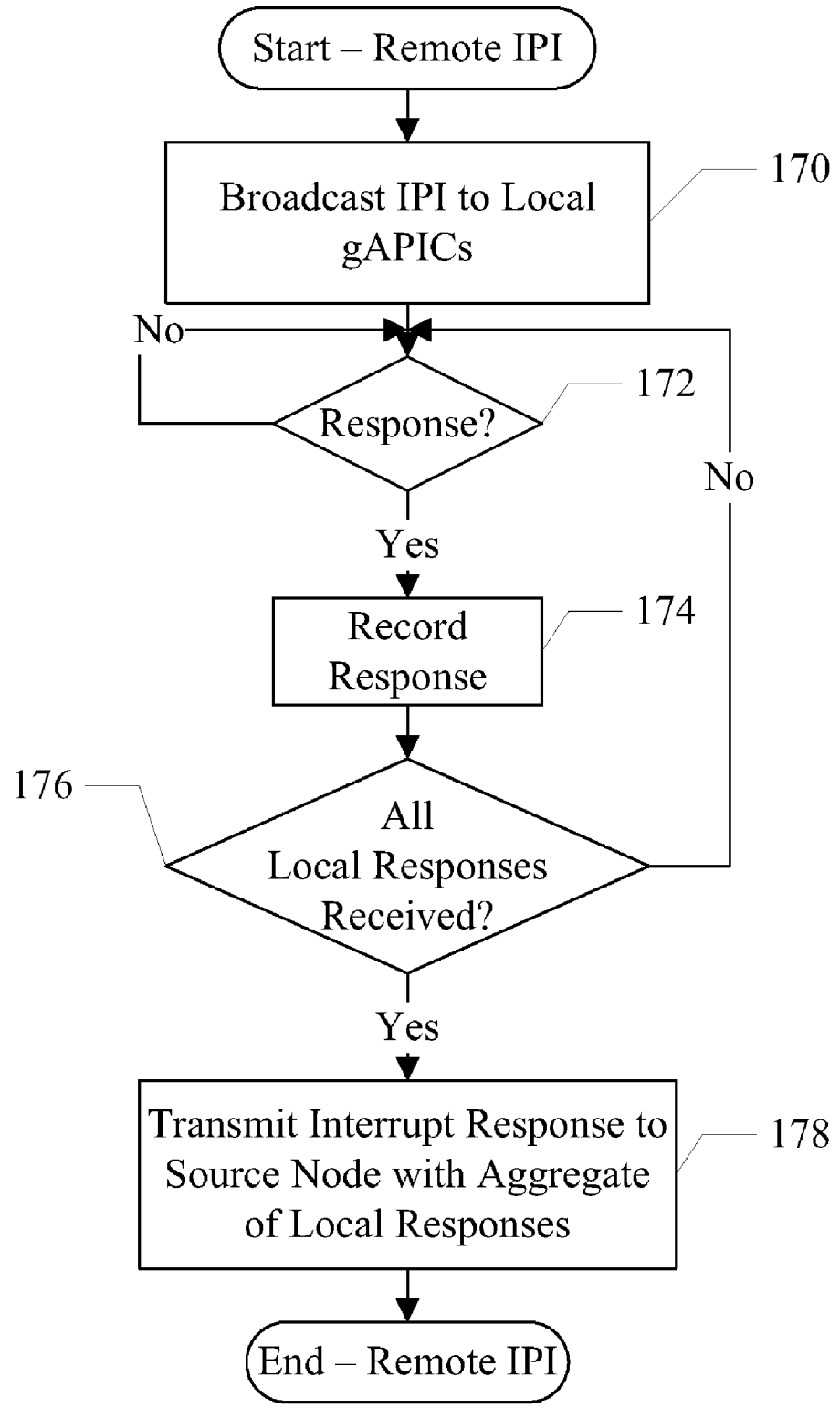
FIG. 5 is a flowchart illustrating operation of one embodiment of an interrupt acceptance control circuit in response to an IPI from a remote node.

Turning now to FIG. 5, a flowchart is shown illustrating operation of one embodiment of the interrupt acceptance control circuit 65A in response to a remote IPI. That is, the operation of the interrupt acceptance control circuit 65A illustrated in FIG. 5 may occur in response to an interrupt message from one of the interface circuits 44A-44C in the node, where the interrupt message includes an IPI. The interrupt acceptance control circuit 65B may be similar. While the blocks are shown in a particular order for ease of understanding, other orders may be used. Blocks may be performed in parallel in combinatorial logic circuitry in the interrupt acceptance control circuit 65A. Blocks, combinations of blocks, and/or the flowchart as a whole may be pipelined over multiple clock cycles. The flowchart of FIG. 5 illustrates operation in response to one remote IPI. If multiple IPIs are supported in parallel, similar operation may be implemented in parallel for the other IPIs.

The interrupt acceptance control circuit 65A may be configured to broadcast the IPI (including guest ID and target IDs) to the local gAPICs 34A-34D (block 170). The interrupt acceptance control circuit 65A may be configured to wait for responses from each gAPIC. When a response is received (decision block 172, "yes" leg), the interrupt acceptance control circuit 65A may be configured to record the response (block 174). The interrupt acceptance control circuit 65A may be configured to continue waiting for responses and recording the responses until all of the local responses have been received (decision block 176, "no" leg). Once all the responses have been received (decision block 176, "yes" leg), the interrupt acceptance control circuit 65A may be configured to transmit the interrupt response to the source node with the aggregate of the local responses (block 178).

Figure 6:
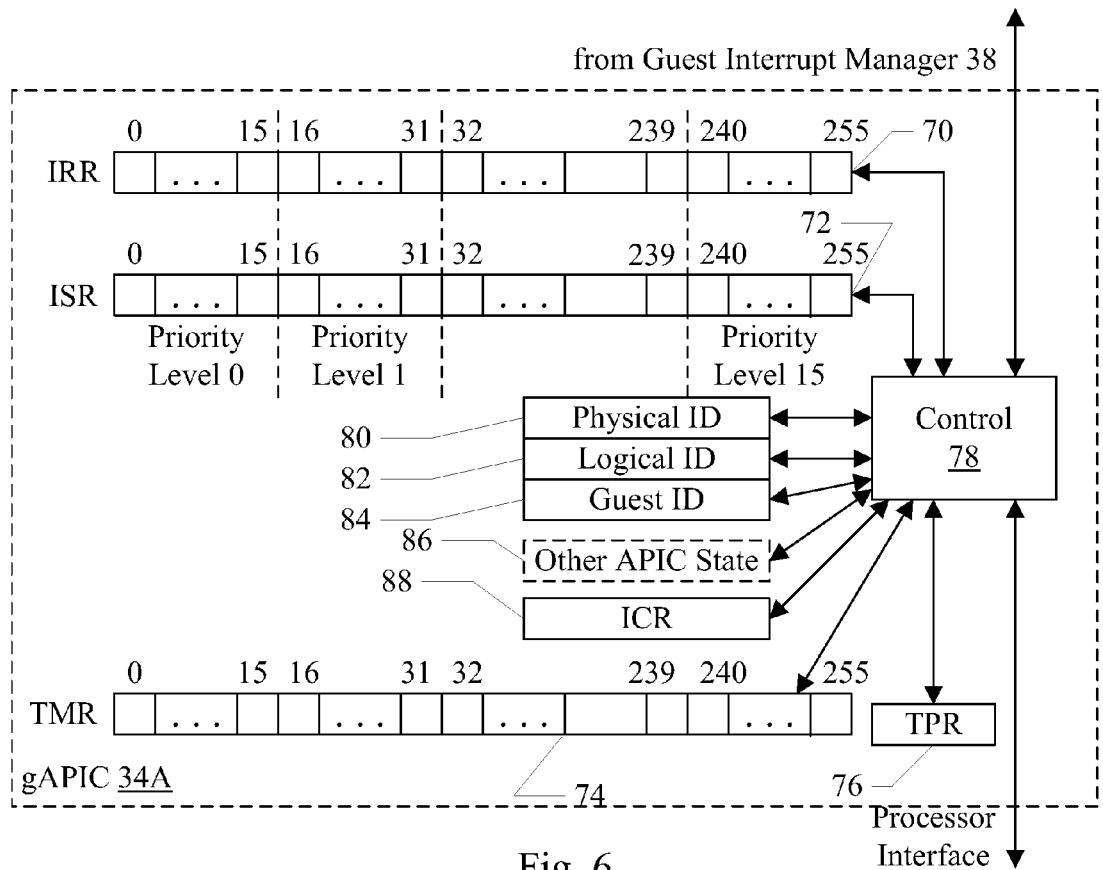
FIG. 6 is a block diagram illustrating one embodiment of a guest advanced programmable interrupt controller (APIC).

Turning now to FIG. 6, a block diagram of one embodiment of the gAPIC 34A is shown. Other gAPICs 34B-34H may be similar. In the embodiment of FIG. 6, the gAPIC 34A includes an interrupt request register (IRR) 70, an interrupt service register (ISR) 72, a trigger mode register (TMR) 74, a task priority register (TPR) 76, a control unit 78, a physical ID register 80, a logical ID register 82, a guest ID register 84, an interrupt command register (ICR) 88, and optionally other APIC state 86. The control unit 78 is coupled to the IRR 70, the ISR 72, the TMR 74, the TPR 76, the physical ID register 80, the logical ID register 82, the guest ID register 84, the ICR 88, and the other APIC state 86. Additionally, the control unit 78 is coupled to communicate with guest interrupt manager 38 to receive interrupts, and to the processor interface to communicate with the processor 30A.

Software executing on the processor 30A may write the ICR register 88 to source an IPI. The ICR register 88 may include fields to specify the interrupt vector, the destination mode (physical or logical), the target(s), etc. Software may update the fields to generate the IPI, and the control unit 78 may issue the IPI. The control unit 78 may include the guest ID in the IPI, along with the data specified by software in the ICR 88. The vector may be used if a fixed interrupt IPI is specified. Other IPIs may also be possible (e.g. lowest priority, system management interrupt, non-maskable interrupt, etc.).

In response to receiving an interrupt message from the guest interrupt manager 38 or an IPI from one of the other gAPICs, the control unit 78 may be configured to write the interrupt in the IRR 70 if the interrupt is targeted at the guest corresponding to the gAPIC 34A. The position of the interrupt request in the IRR corresponds to the interrupt vector. The IRR may track the "fixed" interrupts. Other interrupt types may include non-maskable interrupt (NMI), system management interrupt (SMI), legacy external interrupt (ex-tINT), etc. These interrupts may be handled as part of the other APIC state 86. The control unit 78 may also generate an acceptance/non-acceptance (ACK/NACK) for the interrupt message.

In one embodiment, the interrupt message may also include a trigger mode for each interrupt (level or edge). The TMR 74 may store an indication of which trigger mode applies to the interrupt. For example, edge triggered interrupts may be represented by a binary 0 in the TMR 74 and level triggered may be represented by a binary 1. In other embodiments, only edge triggered interrupts may be supported in the gAPIC 34A, and the TMR 74 (and its copy in the gAPIC state data structure 58) may be eliminated. In another embodiment, the TMR 74 may be repurposed to permit the VMM 18 to log virtual level sensitive interrupts. The VMM 18 may set various bits in the TMR 74 to indicate that, if an end of interrupt is signalled by the processor 30A for the corresponding interrupt vector, the processor 30A exits to the VMM 18.

For fixed interrupts, the gAPIC 34A may be configured to prioritize the interrupt requests and in-service interrupts to determine if an interrupt request should be delivered to the processor. Generally, if the highest priority interrupt request is higher priority than the highest priority in-service interrupt (where an interrupt is in-service if the processor has interrupted its software execution to execute the interrupt handler corresponding to the interrupt), the control unit 78 may be configured to deliver the requested interrupt to the processor 30A. Additionally, the TPR 76 may be programmed by software to establish the minimum priority level of interrupt that is being accepted by the processor 30A. The control unit 78 may be configured to deliver the highest priority interrupt request if it is higher priority than the highest priority in-service interrupt and if it is higher priority than the priority indicated in the TPR 76.

When the processor 30A takes the interrupt, the processor may respond with an interrupt acknowledge command to the gAPIC 34A. The control unit 78 may be configured to remove the highest priority interrupt request from the IRR 70 and log the interrupt as in-service in the ISR 72. The position of the in-service indication corresponding to the interrupt in the ISR may correspond to the interrupt vector of the interrupt. The processor 30A may execute the interrupt service routine (or routines) to service the interrupt. The interrupt service routine may end with an end of interrupt (EOI) command to the gAPIC 34A to signal that the interrupt service is completed. The control unit 78 may be configured to remove the highest priority in-service interrupt from the ISR 72 in response to the EOI command.

Each of the IRR 70, the ISR 72, and the TMR 74 include a location corresponding to each interrupt vector supported by the gAPIC 34A. In the illustrated embodiment, vectors 0 through 255 are supported. The interrupt vector number may also be indicative of its relative priority with other interrupts (e.g. higher vector numbers are higher priority than lower vector numbers, or vice versa in other embodiments). For each interrupt vector, the IRR 70 stores an interrupt request bit indicating whether or not an interrupt is requested at that interrupt vector. For example, the indication may be a bit indicative of a request when set and indicative of no request when clear. Similarly, for each interrupt vector, the ISR 72 stores an in-service bit indicative of whether or not an interrupt is in service for that interrupt vector (e.g. indicative of an in-service interrupt when set and no in-service interrupt when clear). For each interrupt vector, the TMR 74 stores the trigger mode. For each of the IRR 70, the ISR 72, and the TMR 74, the bit location in the register is equal to the interrupt vector number that corresponds to the interrupt.

In the illustrated embodiment, the interrupts are logically arranged into groups which are assigned priority levels for determining if a pending interrupt request is to be delivered to the processor. For example, interrupt vectors 0 to 15 are assigned priority level 0, interrupt vectors 16 to 31 are assigned priority level 1, etc. up to interrupt vectors 244 to 255 at priority level 15. In this embodiment, increasing priority level numbers indicate higher priority level. The control unit 78 may compute a request priority level, which is the highest priority level for which at least one interrupt request is pending in the IRR 70. The control unit 78 may also compute an in-service priority level, which is the highest priority level for which at least one interrupt is indicated as in service in the ISR 72. The control unit 78 may deliver an interrupt if the request priority level exceeds the in-service priority level and also exceeds the priority level indicated in the TPR 76. It is noted that, while 256 interrupt vectors are supported in 16 priority level groups in the illustrated embodiment, more or fewer interrupt vectors and/or more or fewer priority level groups may be supported in other embodiments.

The physical ID register 80 and the logical ID register 82 may store the physical APIC ID and the logical APIC ID assigned to the gAPIC 34A, respectively. The guest ID register 84 may store the guest ID assigned to the gAPIC 34A. Accordingly, the control unit 78 may be configured to accept an interrupt from the guest interrupt manager 38 or an IPI if the interrupt's guest ID matches the guest ID in the guest ID register 84 and either the interrupt is physical and the APIC ID in the interrupt matches the physical ID in the physical ID register 80, or the interrupt is logical and the APIC ID in the interrupt matches the logical ID in the logical ID register 82.

The other APIC state 86 may include internally-generated interrupts, timers, the local vector table, etc. In various embodiments, some or all of the other APIC state 86 may be included in the gAPIC 34A or may be virtualized with intercepts to the VMM 18 and VMM 18 emulation of the state.

The hAPICs 32A-32B may be similar to the gAPIC 34A, except that they may not include the guest ID register. Alternatively, the hAPICs 32A-32B and the gAPICs 34A-34D may be instances of the same hardware (if the gAPICs 34A-34D implement all APIC state), and the guest ID register may include an enable bit indicating whether or not the guest ID is valid, or the guest ID register may be programmed to zero to indicate hAPIC.

Figure 7:
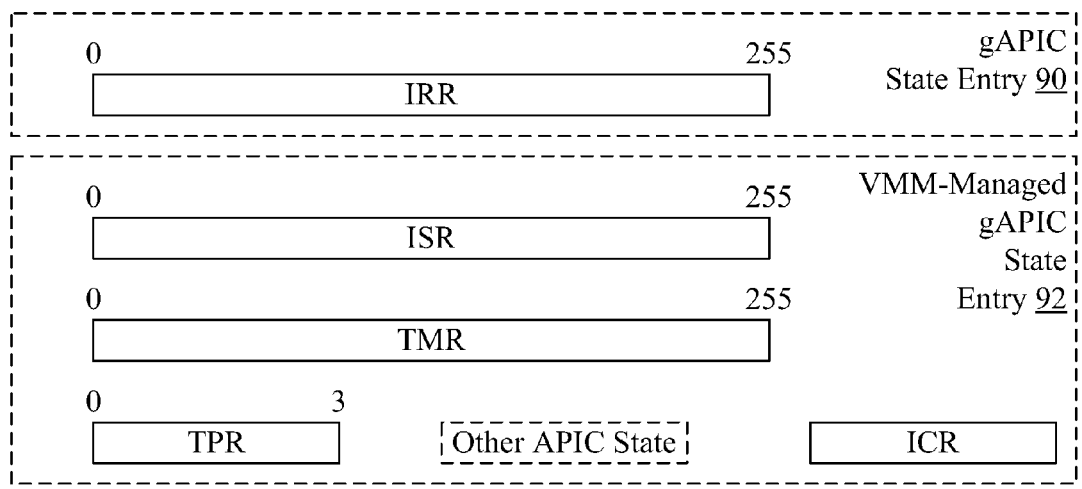
FIG. 7 is a block diagram illustrating one embodiment of a guest APIC state entry in guest APIC state data structure.

Turning now to FIG. 7, a block diagram of one embodiment of one embodiment of the gAPIC state entry 90 and one embodiment of a VMM-managed gAPIC state entry 92 is shown. The illustration in FIG. 7 may be the logical view of the state. The actual arrangement of the state in memory may vary.

Generally, the gAPIC state entry 90 may include at least the gAPIC state that may change while the guest corresponding to the gAPIC state is not active. In the present embodiment, a peripheral device may signal an interrupt to a guest, which may change the IRR state. However, the ISR state may only change when the vCPU in the guest takes the interrupt, which may not occur when the guest is not active. Similarly, the TPR is changed by the vCPU, and thus may not change while the guest is not active. The VMM 18 may manage the saving and restoring of such state in the VMM-managed gAPIC state entry 92

Accordingly, for an embodiment of the gAPIC 34A similar to FIG. 6, the gAPIC state entry 90 may include the state of the IRR 70. The VMM-managed gAPIC state entry 92 may include the state of the ISR 72, the TMR 74, the TPR 76, the ICR 88, and various other APIC state 86. The VMM-managed gAPIC state entry 92 may also store the guest ID and logical and physical IDs, or those may be inherent in selecting the entry 92 (that is, the VMM 18 may use those values to select the entry 92 from the data structure 68).

Figure 8:
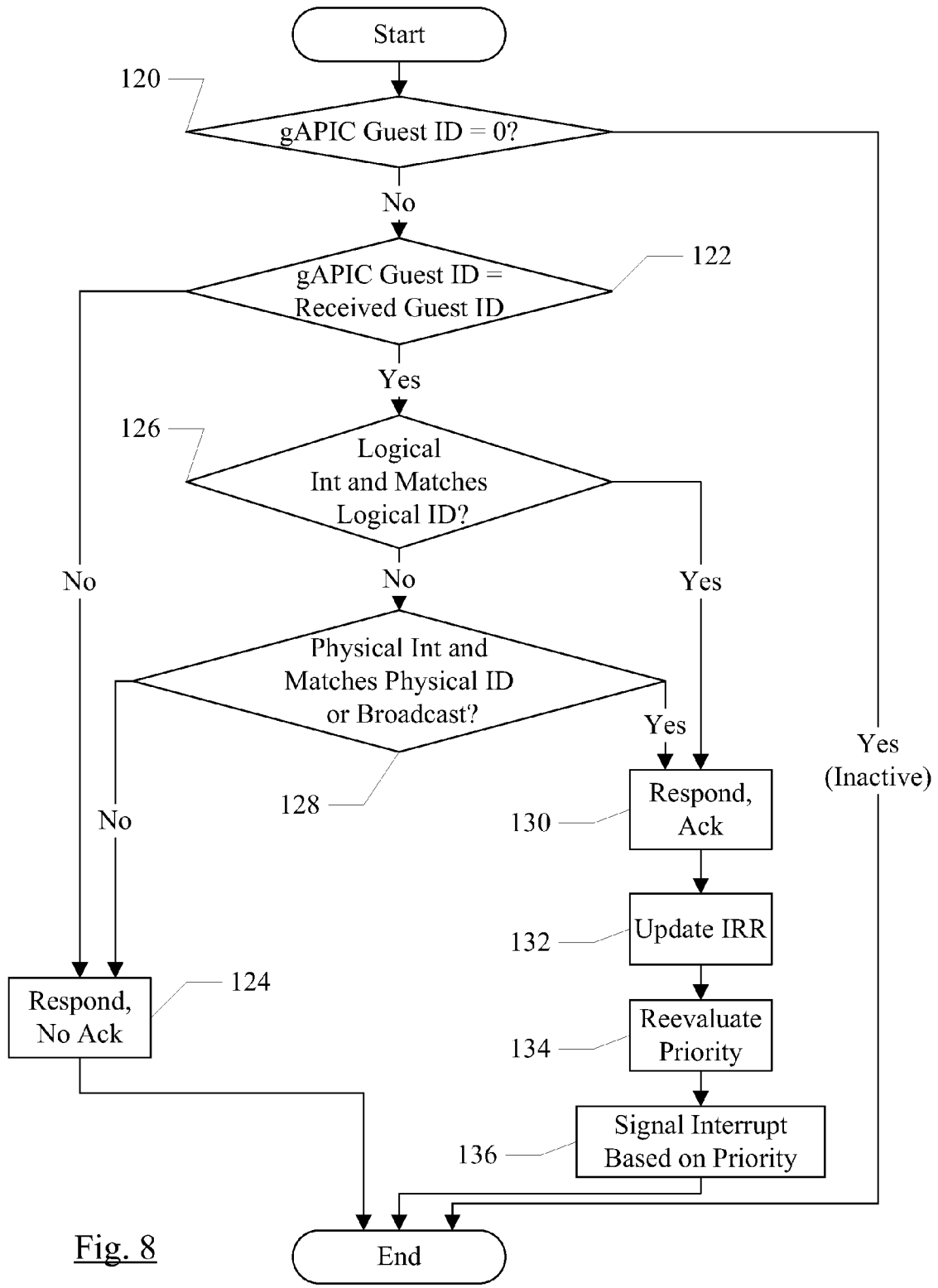
FIG. 8 is a flowchart illustrating operation of one embodiment of a guest APIC in response to receiving an interrupt message.

Turning now to FIG. 8, a flowchart is shown illustrating operation of one embodiment of a gAPIC 34A-34D in response to receiving an interrupt message from the guest interrupt manager 38 or an IPI. While the blocks are shown in a particular order for ease of understanding, other orders may be used. Blocks may be performed in parallel in combinatorial logic in the gAPIC. Blocks, combinations of blocks, and/or the flowchart may be pipelined over multiple clock cycles. Generally, the gAPIC may be configured to implement the operation illustrated in FIG. 8.

In one embodiment, the gAPIC is deactivated by setting its guest ID (in the guest ID register 84, see FIG. 4) to zero. Thus, in response to receiving an interrupt message, if the gAPIC's guest ID is zero (decision block 120, "yes" leg), the gAPIC is inactive and may not process the interrupt. Other embodiments may deactivate a gAPIC in other ways (e.g. an active bit in a register) and the decision block 120 may be modified accordingly to check for gAPIC active/inactive.

If the gAPIC's guest ID is non-zero, the gAPIC may be configured to compare the guest ID to the guest ID of the received interrupt as well as comparing the received destination ID to the logical ID and the physical ID in the registers 80 and 82, respectively (see FIG. 6). If the gAPIC's guest ID does not match the received guest ID (decision block 122, "no" leg), the gAPIC is currently assigned to a different guest and the gAPIC is therefore not targeted by the interrupt. The gAPIC may be configured to respond with a non-acknowledgement of the interrupt (block 124). The non-acknowledgement may indicate that the gAPIC has received the interrupt but has determined that the interrupt is not targeted at the corresponding processor and thus has not been accepted. Similarly, if the gAPIC's guest ID matches the received guest ID, but the interrupt is logical and does not match the gAPIC's logical ID or the interrupt is physical, single destination, and does not match the gAPICs physical ID (decision blocks 126 and 128, "no" legs), the gAPIC may be configured to respond with a non-acknowledgement of the interrupt (block 124).

Matching a logical interrupt may generally include comparing the cluster ID portion of the logical IDs for equality, and detecting that the set bit in the gAPIC's logical ID register is also set in the destination portion of the logical ID received from the interrupt. Other bits in the destination portion of the interrupt's logical ID may also be set if there is more than one logical destination. The physical IDs may be compared for equality, except that a broadcast physical interrupt may be treated as a match as long as the guest ID matches.

If the interrupt is logical and matches the logical ID (decision block 126, "yes" leg) or the interrupt is physical and matches the physical ID or is broadcast (decision block 128, "yes" leg), the gAPIC may be configured to respond with an acknowledgement indicating that the gAPIC is accepting the interrupt for presentation to the corresponding processor 30A-30B (block 130). The gAPIC may also be configured to update the IRR register 70, setting the interrupt request bit corresponding to the interrupt vector in the interrupt message or IPI (block 132). The gAPIC may be configured to reevaluate the priority of the interrupt with respect to any in-service interrupts and/or the task priority register (block 134), and may be configured to signal the interrupt to the processor based on the reevaluation (block 136). That is, the gAPIC may be configured to signal the interrupt if the interrupt's priority is higher priority than an in-service interrupt and higher priority than the task priority register.

Numerous variations and modifications will become apparent to those skilled in the art once the above disclosure is fully appreciated. It is intended that the following claims be interpreted to embrace all such variations and modifications.

What is claimed is:

1. A node comprising:
   one or more interrupt controllers, each interrupt controller associated with a respective processor in the node and configured to interrupt the respective processor in response to one or more interrupts in the interrupt controller, and wherein each interrupt controller is programmable with a guest identifier (ID) to identify an active guest in the respective processor; and
   an interrupt acceptance control circuit coupled to the one or more interrupt controllers, wherein the interrupt acceptance control circuit is configured to monitor the one or more interrupt controllers for acceptance of an interrupt in a first guest, and wherein the interrupt comprises an indication of one or more targeted virtual processors in the first guest, and wherein the interrupt acceptance control circuit is configured to determine whether or not each targeted virtual processor has accepted the interrupt, and wherein the interrupt acceptance control circuit is configured to communicate to a virtual machine monitor responsive to at least one of the targeted virtual processors not accepting the interrupt.

2. The node as recited in claim 1 further configured to communicate the interrupt to at least one other node in a system, wherein one or more processors in the other node are configurable to execute portions of the first guest.

3. The node as recited in claim 2 wherein the other node is configured to return an interrupt response to the node, wherein the interrupt acceptance control circuit is configured to record interrupt acceptances indicated in the interrupt response packet.

4. The node as recited in claim 1 wherein the interrupt acceptance control circuit is configured to initialize a count of a number of targeted virtual processors in response to the interrupt.

5. The node as recited in claim 4 wherein the interrupt acceptance control circuit is configured decrement the count for each acceptance, and wherein the interrupt acceptance control circuit is configured to determine whether or not each targeted virtual processor has accepted the interrupt by comparing the count to zero.

6. The node as recited in claim 1 wherein the interrupt acceptance control circuit is configured to initialize a value identifying the targeted virtual processors in response to the interrupt.

7. The node as recited in claim 6 wherein the interrupt acceptance control circuit is configured to update the value to remove an indication of a first targeted virtual processor in response to acceptance of the interrupt by the interrupt controller corresponding to the first targeted virtual processor, and wherein the interrupt acceptance control circuit is configured to determine whether or not each targeted virtual processor has accepted the interrupt by determining that the value identifies no more targeted virtual processors.

8. The node as recited in claim 1 wherein, in response to a physical broadcast interrupt, the interrupt acceptance control circuit is configured to read a data structure in memory to determine a number of virtual processors in the first guest, wherein the each virtual processor in the first guest is targeted by the physical broadcast interrupt.

9. A method comprising:
   monitoring one or more interrupt controllers for acceptance of an interrupt issued in a first guest, wherein each interrupt controller is associated with a respective processor in a node and is configured to interrupt the respective processor in response to one or more interrupts in the interrupt controller, and wherein each interrupt controller is programmable with a guest identifier (ID) to identify an active guest in the respective processor, and wherein the interrupt indicates one or more targeted virtual processors in the first guest; and
   communicating a lack of acceptance of the interrupt to a virtual machine monitor when at least one targeted virtual processor has not accepted the interrupt.

10. The method as recited in claim 9 further comprising communicating the interrupt to at least one other node in a system, wherein one or more processors in the other node are configurable to execute portions of the first guest.

11. The method as recited in claim 10 further comprising:
    the other node returning an interrupt response to the node; and
    recording interrupt acceptances indicated in the interrupt response in response to receiving the interrupt response.

12. The method as recited in claim 9 further comprising initializing a count of a number of targeted virtual processors in response to issuance of the interrupt.

13. The method as recited in claim 12 wherein the monitoring comprises decrementing the count for each acceptance, and wherein the determining that at least one targeted virtual processor has not accepted the interrupt comprises comparing the count to zero.

14. The method as recited in claim 9 further comprising initializing a value identifying the targeted virtual processors in response to issuance of the interrupt.

15. The method as recited in claim 14 wherein the monitoring comprises updating the value to remove an indication of a first targeted virtual processor in response to acceptance of the interrupt by the interrupt controller corresponding to the first targeted virtual processor, and wherein determining that at least one targeted virtual processor has not accepted the interrupt comprises determining that the value identifies at least one targeted virtual processor.

16. The method as recited in claim 9 further comprising determining that at least one targeted virtual processor has not accepted the interrupt, wherein the communicating is responsive to the determining.

17. A system comprising:
    a first node including one or more first interrupt controllers and a first interrupt acceptance control circuit coupled to the one or more first interrupt controllers, wherein each first interrupt controller is associated with a respective processor in the first node and is configured to interrupt the respective processor in response to one or more interrupts in the first interrupt controller, and wherein each first interrupt controller is programmable with a guest identifier (ID) to identify an active guest in the respective processor, wherein the first interrupt acceptance control circuit, in response to a first interprocessor interrupt (IPI) from one of the one or more first interrupt controllers, is configured to issue a first interrupt message; and
    a second node coupled to the first node, wherein the second node includes one or more second interrupt controllers and a second interrupt acceptance control circuit, and wherein the second interrupt acceptance control circuit, in response to the first interrupt message, is configured to issue the first IPI to the one or more second interrupt controllers and to aggregate responses from the one or more second interrupt controllers, wherein the second node is configured to transmit an interrupt response to the first node to transmit the aggregate response to the first IPI from the second node.

18. The system as recited in claim 17 wherein the aggregate response is a count of the number of interrupt acceptances.

19. The system as recited in claim 17 wherein the aggregate response identifies virtual processors within the guest that have accepted the interrupt.

* * * * *